United States Patent [19]

Reed

[11] Patent Number: 5,731,545
[45] Date of Patent: Mar. 24, 1998

[54] PROTECTIVE HOUSING FOR AN ELECTRICAL DEVICE

[75] Inventor: Carl Gene Reed, Clemmons, N.C.

[73] Assignee: The Whitaker Corporation, Wilmington, Del.

[21] Appl. No.: 807,074

[22] Filed: Feb. 27, 1997

[51] Int. Cl.[6] .................................................. H02G 3/14
[52] U.S. Cl. .............................. 174/66; 220/241; D13/156
[58] Field of Search .......................... 174/66, 67; 220/241, 220/242, 3.8; D13/156; 439/135, 136, 144, 147

[56] References Cited

U.S. PATENT DOCUMENTS

| | | | |
|---|---|---|---|
| 2,516,464 | 7/1950 | Hooser | 174/67 |
| 2,934,591 | 4/1960 | Tiikkainen | 174/67 |
| 3,491,327 | 1/1970 | Tait et al. | 174/67 X |
| 3,504,099 | 3/1970 | Beinhaur | 174/72 |
| 3,652,781 | 3/1972 | Robbins | 174/67 |
| 4,188,082 | 2/1980 | Dickey | 339/36 |
| 4,473,265 | 9/1984 | Dellinger et al. | 339/39 |
| 4,530,555 | 7/1985 | South | 439/135 X |
| 4,600,261 | 7/1986 | Debbaut | 339/116 |
| 4,634,207 | 1/1987 | Debbaut | 339/116 |
| 4,643,502 | 2/1987 | Arnold | 174/67 X |
| 4,694,619 | 9/1987 | Dabich | 52/20 |
| 5,067,907 | 11/1991 | Shotey | 174/66 X |
| 5,078,614 | 1/1992 | Shotey | 174/67 X |
| 5,497,893 | 3/1996 | Mangone, Jr. | 220/3.8 |
| 5,549,487 | 8/1996 | Nortier | 439/521 |

FOREIGN PATENT DOCUMENTS

| | | | |
|---|---|---|---|
| 2060966 | 6/1972 | Germany | 439/135 X |
| 1243712 | 8/1971 | United Kingdom | 439/136 X |

*Primary Examiner*—Kristine L. Kincaid
*Assistant Examiner*—Dean A. Reichard
*Attorney, Agent, or Firm*—Robert Kapalka

[57] ABSTRACT

A protective housing for an electrical device includes a base and a cover. The base has a mounting station for the electrical device, and the cover can be installed over the base with the electrical device received inside the cover. The cover has an open bottom which permits air to circulate inside the cover in order to dry any condensation which might form on the electrical device. The cover is made from an air and water impermeable material. Should flooding occur, air trapped within the cover prevents floodwater from rising into the cover, thereby protecting the electrical device from immersion.

8 Claims, 5 Drawing Sheets

PROTECTIVE HOUSING FOR AN ELECTRICAL DEVICE

FIELD OF THE INVENTION

The invention relates to a housing which is adapted to support an electrical device and protect the device from adverse elements; particularly liquids.

BACKGROUND OF THE INVENTION

Telephone wiring systems in buildings typically include various cables which are interconnected by electrical connectors such as modular plugs and jacks. Installed cables which run along or within walls of the building are terminated with modular jacks, and these are mounted on the walls to provide convenient interconnection points for modular plugs which are connected to telephone equipment. The modular jacks are generally mounted near floor level, often on a baseboard, because the modular plugs are usually on ends of cables that merely lay on the floor.

Many devices are known for mounting a modular jack on a wall surface. These devices generally include a baseplate which attaches to the wall surface and supports the modular jack, and often include a cover which attaches to the baseplate and partially surrounds the jack in order to protect the jack against dust, dirt and damage due to accidental contact.

A problem with wall mounted modular jacks is that exterior walls of a building may be relatively cold when the outdoor temperature is significantly lower than the indoor temperature, and the colder temperature may lead to condensation of water vapor on contacts in the jack. Further, a new specification for surface mounted modular jacks which is promulgated in Bellcore Technical Reference TR-NWT-001334 includes stringent standards for protection from high humidity, spills, splash, floods, etc.

The prior art devices for protecting against such damaging elements generally try to seal out the elements as much as possible. As an example, U.S. Pat. No. 4,473,265 discloses a protective structure for a surface mounted jack which is attached to a baseplate, the structure including a housing which attaches to the baseplate, a cylindrically-shaped cover rotatably mounted on the housing, and a spring which biases the cover closed. This structure provides good protection against contaminants such as dust, dirt, spills and splash because the jack is fully enclosed by the cover and is essentially sealed off from air infiltration. However, this structure probably would not comply with the Bellcore specification because floodwater would infiltrate the structure through narrow gaps between components. Also, once humidity enters the structure and condenses on the contacts of the modular jack, the condensation will be slow to dissipate due to the minimal air circulation through the structure. In order to overcome these problems, the prior art would tend to provide more and better sealing in an attempt to fully seal out the contaminants, but this leads to complex structures that are expensive to produce. There is a need for a simple structure which provides good protection from damaging elements and meets the requirements of the Bellcore specification.

SUMMARY OF THE INVENTION

The invention is a protective housing for an electrical device. The housing comprises a base adapted to support the electrical device, and an impermeable cover which encloses an interior space that is open only through a bottom of the cover. The cover is mountable over the base with the electrical device received within the interior space, wherein air trapped within the cover prevents floodwater from rising into the interior space, thereby protecting the electrical device.

In one embodiment, the base includes a main portion having a mounting station for the electrical device, and a sub-portion which is attachable to a wall surface. The sub-portion is spaced from the main portion so that only the main portion is received within the cover when the sub-portion is attached to the wall surface.

BRIEF DESCRIPTION OF THE DRAWINGS

The invention will now be described by way of example with reference to the accompanying drawings wherein.

DETAILED DESCRIPTION OF THE PREFERRED EMBODIMENT

Figure 1:
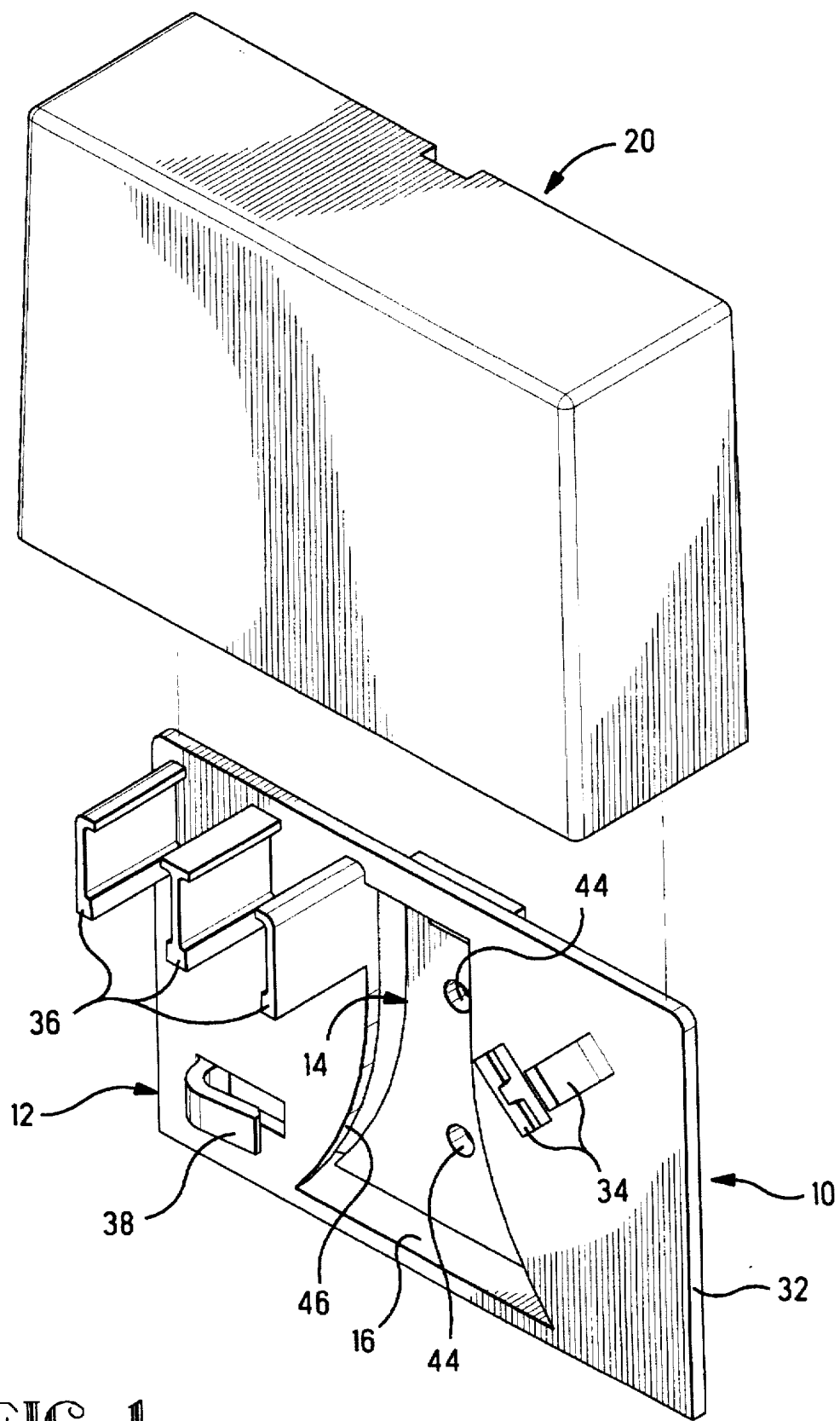
FIG. 1 is a front isometric view of a base and cover which comprise a housing according to the invention.
Figure 2:
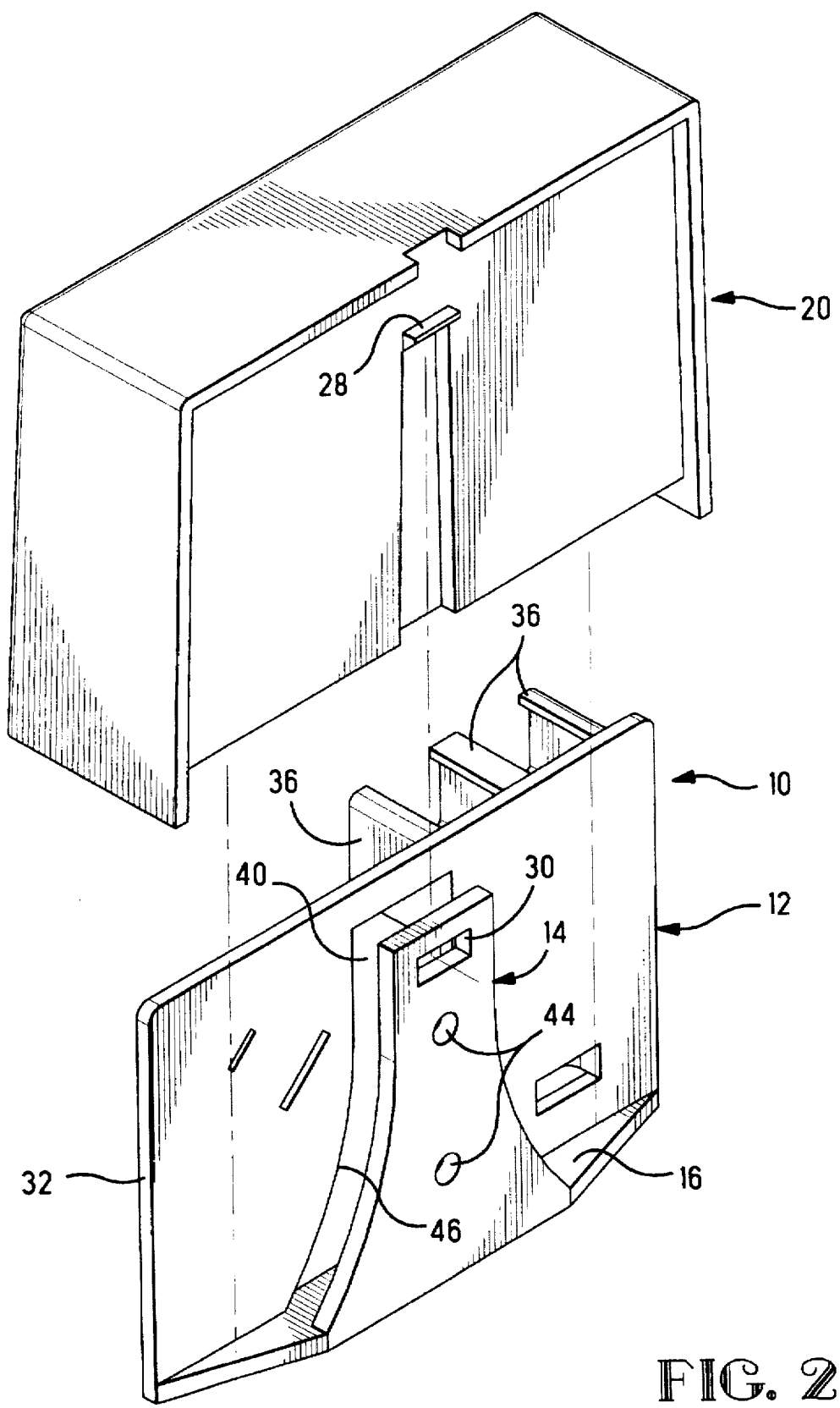
FIG. 2 is a rear isometric view of the base and cover.
Figure 3:
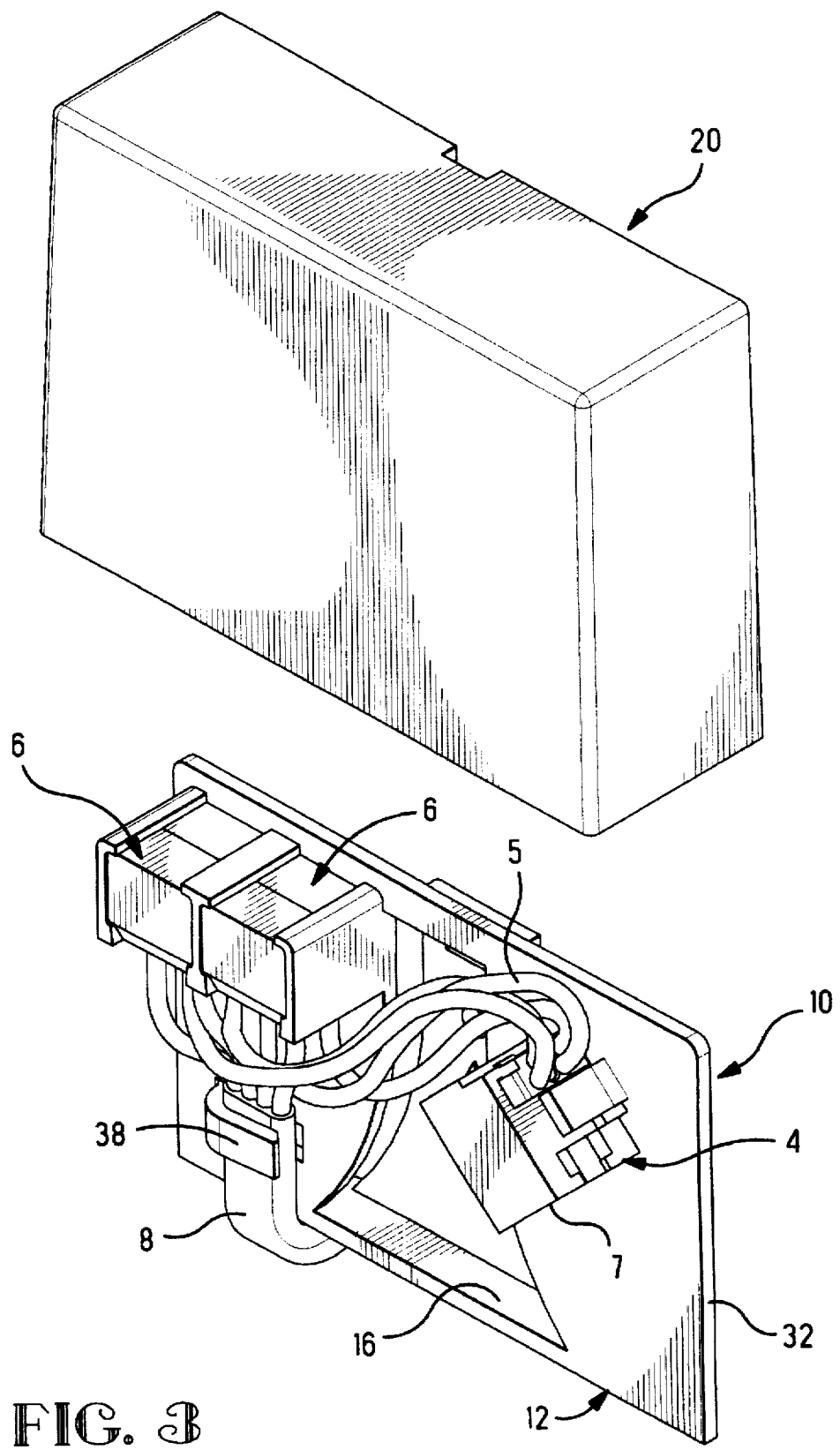
FIG. 3 a front isometric view of the base and cover with electrical connectors installed on the base.
Figure 4:
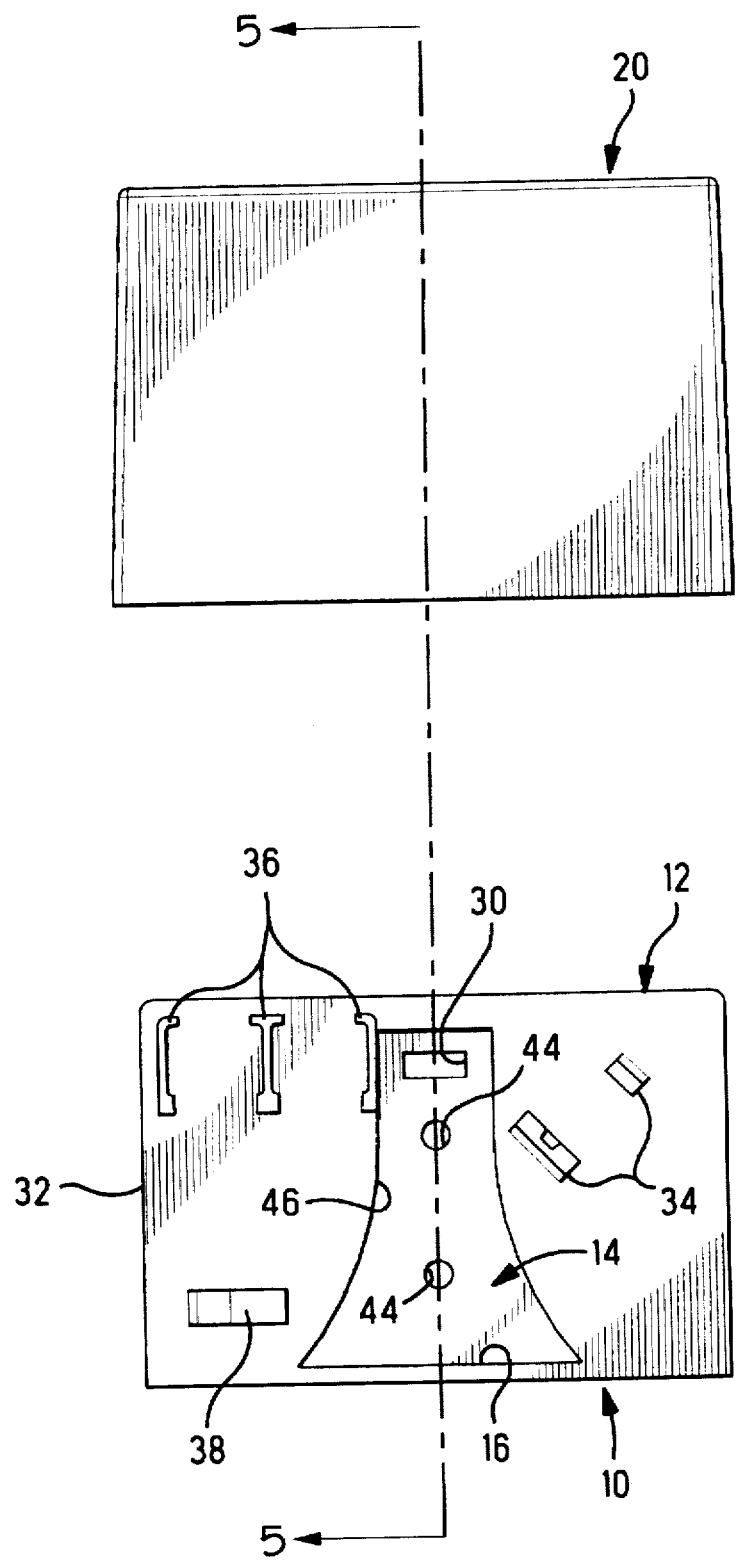
FIG. 4 is a front view of the base and cover.

A protective housing according to the invention comprises a base 10 and a cover 20 as shown in FIGS. 1–3. The base 10 includes a main portion 12 which has at least one mounting station for an electrical device such as an electrical connector, and a sub-portion 14 which is attachable to a structural wall such as a wall of a building or a partition of modular office furniture. The main portion 12 includes a plate 32 having on its front surface support members 34 which provide a mounting station for a flying leaded modular jack (shown in FIG. 3) of a type which is known in the telephone industry, an array of support members 36 which provide mounting stations for a pair of seal splices 6 which are also known, and a finger 38 which is configured to secure a cable 8 of a telephone wiring system. The support members 34 and 36 are configured to cooperate with selected surfaces of the flying leaded modular jack 4 and the seal splices 6 so that the connectors 4, 6 are removably held on the base 10.

Figure 5:
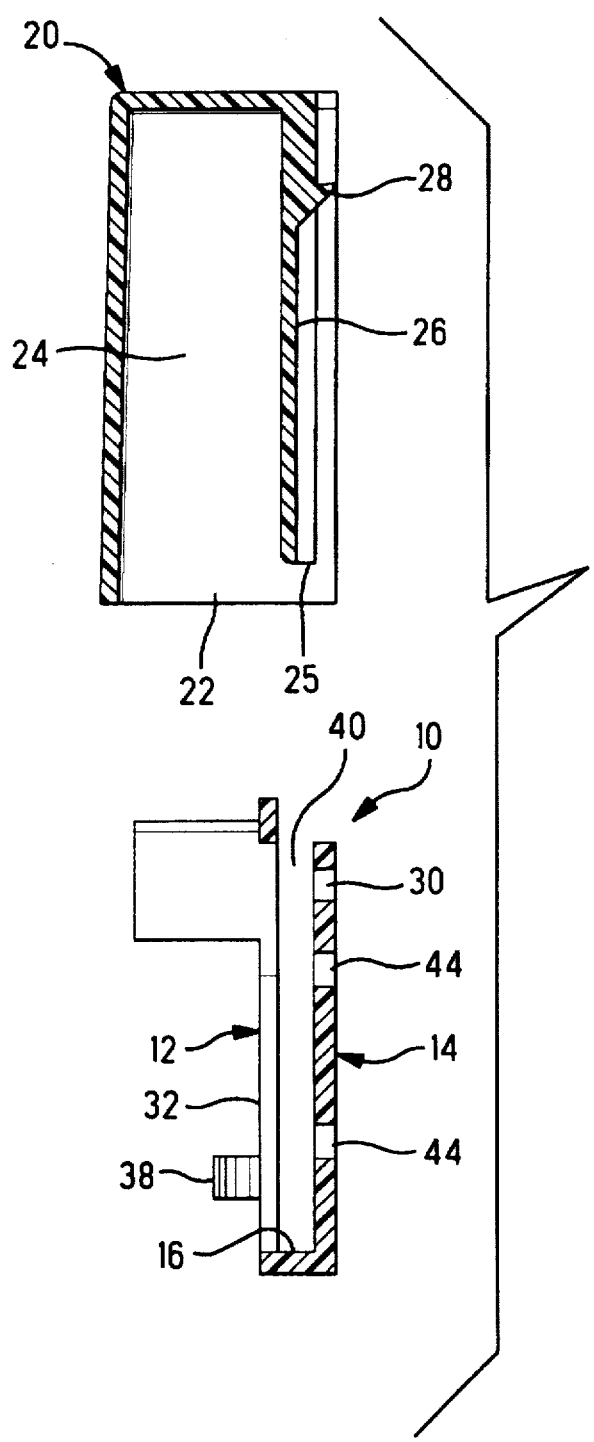
FIG. 5 is a cross-sectional view taken along line 5—5 of FIG. 4.

The sub-portion 14 of the base 10 is behind the plate 32. As best seen in FIG. 5, the sub-portion 14 is connected to the plate 32 by a bridge 16 and is horizontally spaced from the plate 32 by a gap 40. The sub-portion 14 has a pair of through-holes 44 which can receive screws or other fasteners for securing the base 10 to a structural wall, and the plate 32 has an aperture 46 (FIG. 1) which permits the fasteners to be installed through the plate 32 for attachment to the structural wall. It should be noted that the connectors 4, 6 can be installed and removed from the base 10 when the base is attached to the structural wall.

When the base 10 is attached to a structural wall, the telephone cable 8 can be routed upwardly from below the base 10, as shown in FIG. 3, and installed behind the finger 38. Individual wires from the cable 8 can be terminated in the seal splices 6, along with individual leads 5 from the flying leaded modular jack 4. The jack 4 has a cavity in side 7 which receives a mating modular plug (not shown). The support members 34 are arranged so that the jack 4 is mounted on an incline with the side 7 disposed downward so that any accumulation of liquid such as condensate in the jack will be urged by gravity to flow out of the cavity in side 7 of the jack. Also, the seal splices 6 are arranged so that all wires enter through a bottom thereof, whereby any condensate or other liquid will be allowed to drain out of the seal splices. Further, the leads 5 are routed along a looping path which encourages any surface liquid to gather and drip from lower portions of the leads.

The cover 20 is a substantially rectangular box-shaped member which has an open bottom 22. The cover 20 encloses an interior space 24 which is sized to accommodate the main portion 12 of the base along with the connectors 4, 6 and associated wiring. The interior space is open only through the bottom 22. That is, the cover 20 is made from an air and water impermeable material, preferably a suitable plastic, which has no apertures or perforations that could permit air or water to enter into the interior space except through the open bottom 22.

Figure 6:
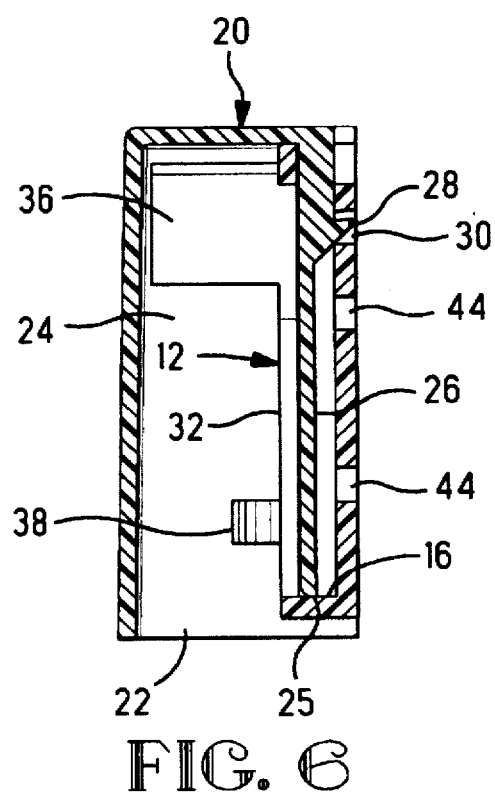
FIG. 6 is a cross-sectional view showing the cover installed on the base.

With reference to FIGS. 5 and 6, the cover is mountable on the base by inserting wall 26 of the cover into the gap 40 and sliding the cover downwardly until the main portion 12 of the base along with the connectors 4, 6 mounted thereon is disposed in the interior space 24. The cover has a latch 28 which is interengageable with a recess 30 in the sub-portion 14 to secure the cover to the base. The cover can be removed by deflecting the wall 26 with a tool such as a screwdriver to withdraw the latch 28 from the recess 30.

The cover advantageously prevents the connectors 4, 6 from being immersed in water during flooding. When the base 10 is attached to a structural wall and the cover 20 is mounted on the base, air is trapped in the interior space 24 when floodwater rises above lower edge 25 of the wall 26. This trapped air exerts pressure which prevents floodwater from entering the interior space, thereby protecting the connectors 4, 6 from immersion.

A housing according to the invention has other advantages. First, the open bottom 22 permits condensate which accummulates on the connectors and wires to drip out of the housing. Second, the open bottom 22 permits air to circulate through the housing, thereby helping to dry any condensate which remains on connector surfaces.

The invention having been disclosed, a number of variations will now become apparent to those skilled in the art. Whereas the invention is intended to encompass the foregoing preferred embodiments as well as a reasonable range of equivalents, reference should be made to the appended claims rather than the foregoing discussion of examples, in order to assess the scope of the invention in which exclusive rights are claimed.

I claim:

1. A protective housing for an electrical device, comprising:

a base adapted to support the electrical device; and an impermeable cover which by itself encloses an interior space that is open only through a bottom of the cover, the cover being mountable over the base with the electrical device received within the interior space, wherein air trapped within the interior space prevents floodwater from rising into the interior space, thereby protecting the electrical device.

2. The housing according to claim 1, wherein the cover is a one-piece unit.

3. The housing according to claim 1, wherein the base includes a main portion having a mounting station for the electrical device, and a sub-portion which is attachable to a wall surface, the sub-portion being spaced from the main portion whereby the main portion can be received within the cover when the sub-portion is attached to the wall surface.

4. The housing according to claim 3, wherein the main portion and the sub-portion are separated by a horizontal gap, and the cover has a wall which is insertable into the gap.

5. The housing according to claim 4, wherein the cover is securable to the base by an interengageable latch and recess.

6. The housing according to claim 5, wherein the interengageable latch and recess comprises a projection on the wall of the cover which enters a recess in the sub-portion.

7. The housing according to claim 6, wherein the wall of the cover is deflectable to withdraw the projection from the recess, whereby the cover can be removed from the base.

8. The housing according to claim 1, wherein the cover is securable to the base by an interengageable latch and recess.

* * * * *